United States Patent Office 3,432,499
Patented Mar. 11, 1969

3,432,499
TRIFLUOROMETHYLAZASPIRANES AND AZASPIRANE DIONES
Leonard M. Rice, Baltimore, Md., and Charles H. Grogan, Falls Church, Va., assignors to Geschickter Fund for Medical Research, Inc., Washington, D.C., a corporation of the District of Columbia
No Drawing. Filed Apr. 2, 1965, Ser. No. 445,246
U.S. Cl. 260—247.5   3 Claims
Int. Cl. C07d 99/04, 27/06, 29/20

ABSTRACT OF THE DISCLOSURE

Trifluoromethylazaspiranes of the general formula:

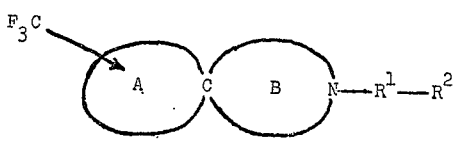

and acid addition and quaternary salts thereof.

---

The present invention relates to novel organic compounds and, more specifically, to trifluoromethylazaspirodiones and trifluoromethylazaspiranes.

The present application has a number of significant objects. A primary object of the present invention is to provide novel synthetic organic compounds, said compounds being characterized by their activity on the peripheral and central nervous system of mammals.

Another object of the present invention is to provide novel trifluoromethylazaspirodiones (imides) having a variety of pharmacological properties, among which are local anesthetic, analgesic, antihistaminic, central nervous stimulant and depressant and hypotensive properties, and trifluoromethylazaspiranes having all of the aforementioned properties. In addition, some of these tertiary amines, as well as some of their bis-quaternary salts, have potent hypotensive activity in the rat and the dog. Some of the trifluoromethylazaspirodiones and the tertiary amine azaspiranes exhibit growth regulatory properties on cells growing in tissue culture media.

It is a further object of the present invention to provide novel compounds which are useful in the treatment of disease wherein one or more of the pharmacological properties enumerated provide a therapeutic effect on the disease.

These and other objects of the instant application will become more apparent through reference to the ensuing description and appended claims.

The compounds of the present invention may be divided into four groups: (1) trifluoromethylazaspirodiones; (2) trifluoromethylazaspiranes, which may be prepared from said trifluoromethylazaspirodiones; (3) the simple acid addition salts of the first two groups of compounds; and (4) the quaternary and bis-quaternary salts of the first two groups of compounds.

The novel trifluoromethylazaspirodiones of the present invention are illustrated in Formula I:

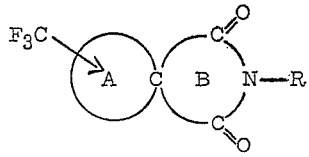

In the formula, ring A is a cyclohexane ring substituted by a trifluoromethyl group on any ring carbon atom except the spiro carbon atom. Ring B is a ring of 5 to 6 ring atoms, one of which is nitrogen and the remainder of which are carbon. Ring B of Formula I shows that the nitrogen atom of this ring has a carbonyl group on either side of and immediately adjacent the heteronitrogen atom.

The substituent R is selected from the group consisting of: (a) hydrogen, (b) alkyl, (c) alkenyl, (d) alkoxyalkyl, (e) alkynyl, (f) cycloalkyl, (g) aryl, (h) hydrazono, (i) a heterocyclic group selected from the class consisting of morpholino, pyrrolidino, piperidino, piperazino, hexamethyleneimino and heptamethyleneimino and their lower alkyl ring substituted derviatives, and (j) —$R^1$—$R^2$, where $R^1$ is selected from the group consisting of alkylene, alkenylene, and alkylene and alkenylene substituted by a hydroxyl group on a carbon atom at least β to all nitrogen atoms, and $R^2$ is selected from the group consisting of aryl, cycloalkyl, dialkylamino or alkylamino the nitrogen atom of which is attached to $R^1$, dialkenylamino or alkenylamino the nitrogen atom of which is attached to $R^1$, and a heterocyclic group selected from the group consisting of morpholino, pyrrolidino, piperidino, piperazino, hexamethyleneimino and heptamethyleneimino a nitrogen atom of which is connected to $R^1$, and the lower alkyl ring substituted derivatives of said heterocyclic group.

While there is no upper limit on the number of chain atoms in the alkyl, alkenyl, alkoxyalkyl and alkynyl moieties forming R, in the alkylene, alkenylene and hydroxy-substituted alkylene and alkenylene moieties forming $R^1$, and in the alkyl (or dialkyl), alkenyl (or dialkenyl) moieties forming $R^2$, a preferred upper limit is 22 chain atoms for each of these, with 10 chain atoms being particularly desirable in the case of the $R^1$ moieties mentioned and 6 chain atoms being particularly desirable in the case of the $R^2$ moieties mentioned.

Similarly, while there is no upper limit on the number of ring atoms in the cycloalkyl and aryl moieties forming R and $R^2$, a preferred upper limit is 10 ring atoms for the aryl moieties and 22 ring atoms for the cyclo-alkyl moieties with rings of 6 atoms being particularly desirable in the case of the aryl and cycloalkyl moieties forming $R^2$.

The novel trifluoromethylazaspiranes of the present invention are illustrated in Formula II:

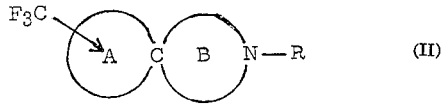

In this formula all of the symbols have the same significance set forth in connection with the compounds of Formula I. The only difference between the compounds of Formula II and those of Formula I is that the former do not contain the two oxygen atoms in ring B. The compounds of Formula II can be readily derived from those of Formula I by reduction of the two carbonyl carbons adjacent to the nitrogen atom of ring B.

The novel trifluoromethylazaspirodiones of the present invention may be obtained by heating approximately molar quantities, or a slight excess of the amine, with the appropriate trifluoromethylcyclohexane-1, 1-diacetic acid or anhydride or trifluoromethylcyclohexane-1-carboxy-1-acetic acid or anhydride with ammonia or the appropriate primary amine sufficiently to form the azaspirodione, or imide, by elimination of water between the acid or anhydride and the ammonia or primary amine reactants. A temperature of 140–240° C. generally suffices for this purpose, with a temperature of 160–220° C. being preferred.

By way of illustrating the wide variety of starting materials that may be employed to obtain the products of this invention, the following types of primary amines may be reacted with any desired trifluoromethylcyclohexane-1,1-diacetic acid or anhydride or trifluoromethylcyclohexane-1-carboxy - 1 - acetic acid or anhydride: (1) ammonia; (2) alkylamines: methyl, hexyl, dodecyl, isobutyl, eicosyl; (3) alkenylamines: allyl, methallyl, oleyl, crotyl, undecenyl; (4) alkynylamines: propargyl, undecynyl; (5) alkoxyalkylamines: methoxypropyl, ethoxyethyl, methoxydecyl, methoxydodecyl, octadecyloxyethyl; (6) cycloalkylamines: cyclopentyl, cyclohexyl, cyclooctyl, cyclododecyl, cycloeicosyl; (7) arylamines: aniline, the anisidines, aminopyridines, aminoquinolines, naphthylamines, p-chloroaniline, 3,4-dimethoxyaniline, 2-aminothiazole, 2-amino-1,2,3,4-tetrahydroquinoline, 2-amino - 1,2,3,4 - tetrahydronaphthalene; (8) heterocycles: 1-aminomorpholine, 2-aminomorpholine, 3-aminopiperidine, 1-aminopyrrolidine, α-aminopiperazine, 1 - amino-2,6-dimethylmorpholine, 1-aminohexamethyleneimine, 1-aminoheptamethyleneimine; (9) dialkylaminoalkylene and alkenylene amines: dimethylaminohexyl, dihexylaminoethyl, dimethylaminoallyl, dipropylaminodecyl, dimethylaminoeicosyl, dieicosylaminoethyl, didodecylaminoallyl, dimethylaminododec-4-enyl, dimethylaminoeicos - 14 - enyl, didecylaminoethyl; (10) dialkenylaminoalkylene and alkenylene amines: diallylaminoethyl, dihexenylaminopropyl, dieicos-14-enylaminoethyl, diallylaminoallyl; (11) heterocyclicalkylene and alkenyleneamines: morpholinohexyl, 2,6-dimethylmorpholinopropyl, 3-(4-methylpiperazino) propyl, pyrrolidinoethyl, piperidinobutyl, hexamethyleneiminopropyl, heptamethyleneiminopropyl, morpholinoallyl, piperidinohexenyl; (12) aralkylamines: phenylethyl, benzyl, 2-aminoethylpyridine, benzhydryl, p-chlorophenylpropyl, p-fluorophenylpropyl, p-fluorophenylbutyl, 2-aminoethylquinoline, 2-aminoethylisoquinoline, 2-aminopropyldecahydroquinoline, 2-aminomethyltetrahydroquinoline, 2-aminopropylnaphthalene, 2-aminopropyldecahydronaphthalene, 2-aminopropyltetrahydronaphthalene; (13) cycloalkylaminoalkylene and alkenylene amines: cyclohexylaminoethyl, cyclopentylaminopropyl, cyclododecylaminoethyl, cycloeicosylaminoethyl, cyclohexyl, aminoallyl, cyclopentylaminoallyl; (14) alkylaminoalkylene and alkenylene amines: methylaminoethyl, methylaminobutyl, butylaminoallyl, dodecylaminohexenyl; (15) alkenylaminoalkylene and alkenylene amines: allylaminopropyl, hexenylaminobutyl, eicos-14-enylaminopropyl, allylaminohexenyl; (16) alkyl and alkenylaminoalkanolamines: 1-amino-3-diethylamino-2-propanol, 1-amino-3-diallylamino-2-propanol; (17) unsymmetrical hydrazines: dimethyl, dihexyl, diisopropyl, dibutyl, diphenyl.

Quite obviously, still other materials within the framework of the present invention could be enumerated, but it would serve no useful purpose to do so, it being sufficient to state that any acid or anhydride and primary amine having the structural characteristics of the types previously enumerated and which are stable under the conditions of the aforementioned synthesizing procedures can be utilized in accordance with the present invention. This would obviously include various of the above materials in substituted form such, for example, as the partially nuclear hydrogenated or other nuclear substituted derivatives of materials such as the aralkylamines or the arylamines, etc.

In addition to the novel trifluoromethylazaspirodiones and trifluoromethylazaspiranes disclosed herein, the present invention contemplates the conversion of these two classes of compounds into their non-toxic, therapeutically useful acid addition and quaternary salts. Formulae III, IV and V illustrate the types of salts formed from the trifluoromethylazaspiranes:

(III)

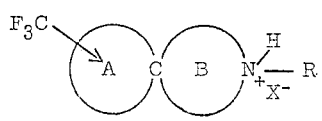

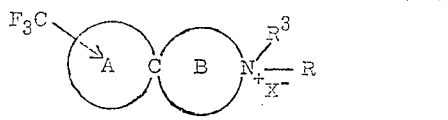
(IV)

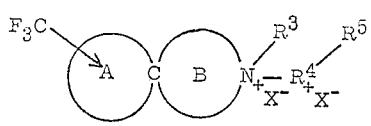
(V)

Formula III represents the simple acid addition salts of the free bases of Formula II resulting from the salting of the ring B nitrogen with non-toxic ions, in which X⁻ represents a non-toxic anion such as chloride, acetate, bromide, sulfate, perchlorate, mucate, succiate, phosphate, etc. In general, those non-toxic salts which are water soluble or soluble in other well-tolerated solvents are particularly useful for therapeutic purposes due to the ease of administration of the salts in their dissolved form.

Formula IV illustrates quaternary salt formation resulting from quaternizing the ring nitrogen of ring B with alkyl esters. In this formula, $R^3$ is an alkyl or alkenyl group preferably of no more than 22 chain atoms and X⁻ may be any of the non-toxic anions useful in forming the simple acid addition salts of Formula III.

Formula V illustrates bis-quaternary salt formation which may result when R (as defined previously in Formula II) contains a basic nitrogen atom (i.e., pyridyl, quinolyl, morpholinyl, etc.); such basic nitrogen-containing moieties are designated by $R^4$ in Formula V. $R^5$ has the same value as $R^3$.

As will be apparent, diacid addition may also result in connection with the simple salting of the free bases of Formula II if the R substituent contains a basic nitrogen atom.

In the case of the trifluoromethylazaspirodiones, salting does not occur in any case on the ring B nitrogen. Salting of the diones may be obtained when R contains a basic nitrogen atom to form acid addition and quaternary dione salts analogous to Formula V and having the general formulae shown below (VI)

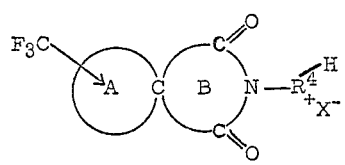

(VII)

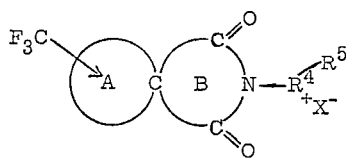

All symbols in Formulae VI and VII have the values previously indicated.

In general, the free bases and their acid addition salts as previously described have useful pharmacological properties, such compounds producing effects on the peripheral and central nervous systems of mammals. In general, the bis-quaternary salts of the free bases having a basic nitrogen atom in addition to the ring B nitrogen have gangliophlegic properties and produce ganglionic blockade in varying degrees of sympathetic and parasympathetic ganglia. The free bases and non-toxic acid addition salts of compounds of the type shown in Examples IV and X possess antihistaminic properties while their bis-quaternary salts are potent ganglionic blocking agents. The dione of Example I is a local anesthetic, mild tranquilizer and sedative while its free base, the compound of Example II, is a central nervous stimulant. The majority of the alkyl, alkenyl, alkynyl and alkoxyalkyl diones have central nervous depressing or stimulating properties depending on the substituent R.

The tertiary amines of Examples XVI and XVIII and their non-toxic acid addition salts are potent hypotensive agents in the dog and act other than by ganglionic blockade. Another of the outstanding pharmacological properties of some of the compounds of this invention is their ability to inhibit the growth of cells in tissue culture (such as KB cell line derived from human epidemoid carcinoma of the nasopharynx) in very low concentrations of the order of a few micrograms/ml. of culture medium. This property is exhibited by the compounds of Examples IV and X.

The following working examples will serve to illustrate the methods employed to obtain the compounds of the present invention.

Example I.—2-dimethylamino-7-trifluoromethyl-2-azaspiro[4.5]decane-1,3-dione

Treatment of 4.8 gm. of 3-trifluoromethylcyclohexane-1-carboxy-1-acetic acid anhydride with an excess of unsym-dimethylhydrazine at 180° C. for 30 minutes gave a quantitative yield of the title compound which solidified on cooling, melted at 60–65° C. and, after two recrystallizations from ligroin, melted at 67.5–69° C.

This material was a local anesthetic and possessed mild sedative and tranquilizing properties.

Example II.—2-dimethylamino-7-trifluoromethyl-2-azaspiro[4.5]decane

Addition of a solution of 5 gm. of the imide from Example I in ether to a solution of 3 gm. of lithium aluminum hydride in anhydrous ether, stirring for 2 hours, decomposition of the addition complex by dropwise addition of water, stirring 2 hours, filtration of inorganic salts, drying the ether solution over anhydrous sodium sulfate, distillation of the ether and vacuum distillation of the residue from semimicro apparatus gave the title compound as a colorless liquid that boiled at 49–51° C. at 0.05 mm.

This material was a central nervous stimulant.

Example III.—2-(3-morpholinopropyl)-7-trifluoromethyl-2-azaspiro[4.5]decane-1,3-dione (a) Reaction of 4 gm. of the anhydride from 3-trifluoromethylcyclohexane - 1-carboxy-1-acetic acid and 3 gm. of 3-morpholinopropylamine and heating at 180° C. for 1 hour gave the title compound, which was isolated by vacuum distillation (yield 5.6 gm.; B.P. 170–180° C. at 0.13 mm.).

(b) The methiodide: treatment of 1 gm. of the preceding imide in 25 ml. of ethyl acetate with 2 ml. of methyl iodide followed by refluxing for 30 minutes and dilution with 100 ml. of ether gave the methiodide of the title azaspirodione (imide), which melted at 168–170° C.

Example IV.—2-(3-morpholinopropyl)-7-trifluoromethyl-2-azaspiro[4.5]decane (a) Reduction of the preceding imide from Example III with lithium aluminum hydride in anhydrous ether as described in Example II gave the title compound as a colorless oil, which was isolated by vacuum distillation and boiled at 120–125° C. at 0.08 mm.

(b) The dimethiodide was obtained by refluxing the title base with an excess of methyl iodide in acetone and diluting with ether. It melted at 231–233° C. with decomposition. This dimethiodide was a potent hypotensive agent in the rat and the dog at 0.5 to 5 mg./kg. dosages. It also produced a prolonged photophobia in the rat.

Example V.—2-methyl-7-trifluoromethyl-2-azaspiro[4.5]decane-1,3-dione

Treatment of 5 gm. of the anhydride of 3-trifluoromethylcyclohexane-1-carboxy-1-acetic acid with an excess of 25% aqueous solution of methylamine, boiling off the water and excess methylamine and heating for ½ hour at 180° C. gave a quantitative yield of the title compound, which solidified on cooling and melted at 119–125° C. It melted at 130–131° C. after recrystallization from acetone-petroleum ether, 30–60°.

This imide was a central nervous stimulant.

Example VI.—2-methyl-7-trifluoromethyl-2-azaspiro[4.5]decane (a) Reduction of the methyl imide from Example V with lithium aluminum hydride as described in Example II gave the title base as a colorless liquid that boiled at 60–64° C. at 0.5 mm.

(b) The methiodide was obtained by refluxing the base in acetone with excess methyl iodide and diluting with ether. It melted at 267–268° C., turning reddish pink.

(c) The hydrochloride was obtained by treating a solution of the base in ether with gaseous HCl, the product melting at 215–217° C. and turning pink.

Example VII.—2-allyl-7-trifluoromethyl-2-azaspiro[4.5]decane-1,3-dione

Treatment of the anhydride of 3-trifluoromethylcyclohexane-1-carboxy-1-acetic acid with excess allylamine and cyclization at 180° C. for 30 minutes gave the title compound as a colorless oil that boiled at 95–98° C. at 0.13 mm.

This material was a central nervous stimulant or depressant depending on dose. At dosages below 50 mg./kg. it acted as a CNS depressant in the rat and dog while at dosages above 100 mg./kg. it was a CNS stimulant in these mammals.

Example VIII.—2-allyl-7-trifluoromethyl-2-azaspiro[4.5]decane

Reduction of the imide from Example VII with lithium aluminum hydride as described in Example II gave the title base as a colorless liquid that boiled at 55–58° C. at 0.17 mm.

Example IX.—3-(3-dimethylaminopropyl)-8-trifluoromethyl-3-azaspiro[5.5]undecane-2,4-dione (a) Treatment of 5 gm. of the anhydride of 3-trifluoromethylcyclohexane-1,1-diacetic acid with a 10% molar excess of 3-dimethylaminopropylamine and cyclization at 180° C. for 1 hour gave a quantitative yield of the title compound.

(b) The methiodide of this imide was obtained by treatment of the imide in acetone with excess methyl iodide and adding ether. It melted at 249–250° C. with decomposition.

(c) The hydrochloride of this imide was obtained by treatment of the imide in ether was gaseous HCl, the product melting at 202–203° C.

Example X.—3-(3-dimethylaminopropyl)-8-trifluoromethyl-3-azaspiro[5.5]undecane (a) Reduction of the imide from Example IX with lithium aluminum hydride as described in Example II gave the title base as a colorless oil.

(b) The dimethiodide was obtained by refluxing the base with an excess of methyl iodide in acetone for 3 hours and diluting with ether. It melted at 273–274° C. with decomposition. This compound was a very potent ganglionic blocking agent and lowered blood pressure in the dog and the rat for protracted periods of time at 0.2–10 mg./kg. dosages administered i.m., i.p. or i.v.

(c) The dihydrochloride was obtained on treatment of an ether solution of the base with gaseous hydrogen chloride and melted at 297–299° C. with decomposition.

Example XI.—8-trifluoromethyl-3-azaspiro[5.5]undecane-2,4-dione

Treatment of 5 gm. of the anhydride of 3-trifluoromethylcyclohexane-1,1-diacetic acid with an excess of concentrated aqueous ammonia, boiling off excess ammonia and water and cyclization at 180° C. for 1 hour gave a quantitative yield of the title imide, which melted at 184–185° C. on recrystallization from water or acetone-water.

This imide was a central nervous stimulant.

Example XII.—8-trifluoromethyl-3-azaspiro[5.5]undecane (a) Reduction of the imide from Example XI with lithium aluminum hydride in ether as described in Example II gave the title compound, which boiled at 120–125° C. at 12 mm.

(b) The hydrochloride was obtained by treating an ether solution of the title base with gaseous HCl, the product melting at 237–238° C. and turning pink.

Example XIII.—2-cyclooctyl-7-trifluoromethyl-3-azaspiro[4.5]decane-1,3-dione

Treatment of 4 gm. of the anhydride of trifluoromethylcyclohexane-1-carboxy-1-acetic acid with 2.2 gm. of cyclooctylamine and cyclization at 220° C. for ½ hour gave the title imide that boiled at 160–164° C. at 0.025 mm.

Example XIV.—2-cyclooctyl-7-trifluoromethyl-2-azaspiro[4.5]decane (a) Reduction of the imide from Example XIII with lithium aluminum hydride in ether as described in Example II gave the title base, which boiled at 110–114° C. at 0.12 mm.

(b) The methiodide melted at 247–248° C.

(c) The hydrochloride melted at 148–150° C.

Example XV.—2-(p-fluorobenzyl)-7-trifluoromethyl-2-azaspiro[4.5]decane-1,3-dione Treatment of the anhydride of 3-trifluoromethylcyclohexane-1-carboxy-1-acetic acid with a slight molar excess of p-fluorobenzylamine and cyclization at 220° C. for 30 minutes gave a quantitative yield of the title imide, which solidified to a hard glass.

Example XVI.—2-(p-fluorobenzyl)-7-trifluoromethyl-2-azaspiro[4.5]decane (a) Reduction of the imide from Example XV with lithium aluminum hydride as described in Example II gave the title base, which boiled at 109–112° C. at 0.08 mm.

(b) The hydrochloride melted at 204–206° C. and was a potent central nervous stimulant.

Example XVII.—2-homoveratryl-7-trifluoromethyl-2-azaspiro[4.5]decane-1,3-dione

Treatment of the anhydride of 3-trifluoromethylcyclohexane-1-carboxy-1-acetic acid with an equimolar quantity of homoveratrylamine (3,4-dimethoxyphenylethylamine) and cyclization at 180° C. for 30 minutes and 220° C. for 10 minutes gave a quantitative yield of the title imide as a viscous glass.

Example XVIII.—2-homoveratryl-7-trifluoromethyl-2-azaspiro[4.5]decane (a) Reduction of the imide from Example XVII with lithium aluminum hydride as described in Example II gave the title base, which boiled at 145–150° C. at 0.11 mm. This substance was a very potent hypotensive agent and produced prolonged hypotension in the dog with a minium of ganglionic blockade.

(b) The hydrochloride melted at 173.5–175.5° C., turning pink.

(c) The methiodide melted at 197–199° C., turning pink.

Example XIX.—2-methoxypropyl-7-trifluoromethyl-2-azaspiro[4.5]decane-1,3-dione

Reaction of the anhydride of 3-trifluoromethylcyclohexane-1-carboxy-1-acetic acid with an excess of 3-methoxypropylamine and cyclization at 180° C. for 1 hour gave the title imide, which boiled at 120–125° C. at 0.08 mm.

Example XX.—7-trifluoromethyl-2-azaspiro[4.5]decane-1,3-dione

Treatment of the anhydride of 3-trifluoromethylcyclohexane-1-carboxy-1-acetic acid with excess concentrated aqueous ammonia and cyclization for 30 minutes at 180° C. gave a quantitative yield of the title imide, which melted at 110–112° C. and could be separated into two fractions by crystallization from acetone-water. The higher melting fraction (M.P. 131–132° C.) is the trans form.

This material was a central nervous stimulant.

Example XXI.—7-trifluoromethyl-2-azaspiro[4.5]decane (a) Reduction of the imide from Example XX with lithium aluminum hydride in ether as described in Example II yielded the title base, which boiled at 40–42° C. at 0.07 mm.

(b) The hydrochloride, a very hygroscopic material, melted at 103–105° C.

(c) The picrate of this amine, prepared solely as a characterizing derivative, melted at 184–185° C. on recrystallization from ethanol.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A compound selected from the group consisting of
(1) a compound of the formula

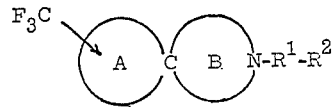

wherein ring A is a cyclohexane ring substituted by a trifluoromethyl group on a ring carbon other than the spiro carbon atom, ring B is a ring of 5–6 ring atoms, said ring atoms other than the nitrogen atom being carbon, $R^1$ is selected from the group consisting of
  (i) alkylene of up to 22 chain atoms,
  (ii) alkenylene of up to 22 chain atoms,
  (iii) alkenylene and alkenylene of up to 22 chain atoms substituted by a hydroxyl group on a carbon atom at least beta to all nitrogen atoms.
and wherein $R^2$ is selected from the group consisting of
  (i) dialkylamino, each alkylamino group being up to 22 chain atoms, the nitrogen atom of which is attached to $R^1$,
  (ii) alkylamono of up to 22 chain atoms, the nitrogen atom of which is attached to $R^1$,
  (iii) dialkenylamino, each alkenylamino group being up to 22 chain atoms, the nitrogen atom of which is attached to $R^1$,
  (iv) alkenylamino of up to 22 chain atoms, the nitrogen atom of which is attached to $R^1$, and
  (v) a heterocyclic group selected from the group consisting of morpholino, pyrrolidino, piperidino, piperazino, hexamethyleneimino and heptamethyleneimino, a nitrogen atom of which is attached to $R^1$;

(2) the non-toxic, pharmaceutically accetpable acid addition salts of compounds (1);

(3) the non-toxic, pharmaceutically acceptable quaternary salts of compound (1) of the formula

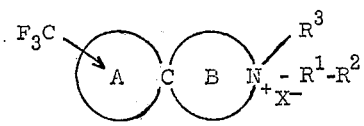

wherein ring A, ring B, the position of the trifluoromethyl group on ring A, $R^1$ and $R^2$ are as defined above, $R^3$ is selected from the group consisting of alkyl and alkenyl of up to 22 chain atoms, and $X^-$ is a non-toxic anion; and (4) the non-toxic, pharmaceutically acceptable bis-quaternary salts of compound (1) of the formula

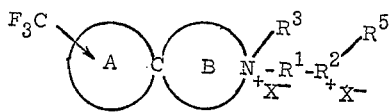

wherein $R^1$, $R^2$, ring A, ring B and the position of the trifluoromethyl group on ring A are as defined above, $R^3$ and $R^5$ are selected from the group consisting of alkyl and alkenyl of up to 22 chain atoms, $R^5$ being attached to the basic nitrogen atom in $R^2$ and $X^-$ is a non-toxic anion.

2. 3 - (3 - dimethylaminopropyl)-8-trifluoromethyl - 3-azaspiro-[5.5]undecane.

3. 2-(3-morpholinopropyl) - 7 - trifluoromethyl-2-azaspiro-[4.5]decane.

References Cited

UNITED STATES PATENTS

| | | | |
|---|---|---|---|
| 2,955,112 | 10/1960 | Jucker et al. | 260—294 |
| 3,106,552 | 10/1963 | Grogan et al. | 260—247.5 |
| 3,256,276 | 6/1966 | Grogan et al. | 260—294 |

HENRY R. JILES, *Primary Examiner.*

E. D. LEWIS, *Assistant Examiner.*

U.S. Cl. X.R.

260—293, 294.7, 326.85, 326.5, 239, 294, 268

UNITED STATES PATENT OFFICE
CERTIFICATE OF CORRECTION

Patent No. 3,432,499                          March 11, 1969

Leonard M. Rice et al.

It is certified that error appears in the above identified patent and that said Letters Patent are hereby corrected as shown below:

Column 8, line 54, "alkenylene" should read -- alkylene --.

Signed and sealed this 17th day of March 1970.

(SEAL)
Attest:

Edward M. Fletcher, Jr.                     WILLIAM E. SCHUYLER, JR.
Attesting Officer                              Commissioner of Patents